(12) United States Patent
Lee et al.

(10) Patent No.: US 9,602,432 B2
(45) Date of Patent: *Mar. 21, 2017

(54) SWITCH AND SELECT TOPOLOGY FOR PHOTONIC SWITCH FABRICS AND A METHOD AND SYSTEM FOR FORMING SAME

(71) Applicant: International Business Machines Corporation, Armonk, NY (US)

(72) Inventors: Benjamin G. Lee, New York, NY (US); Cyriel J. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,356

(22) Filed: Jun. 25, 2015

(65) Prior Publication Data

US 2016/0277817 A1    Sep. 22, 2016

Related U.S. Application Data

(63) Continuation of application No. 14/664,108, filed on Mar. 20, 2015.

(51) Int. Cl.
  *H04J 14/00* (2006.01)
  *H04L 12/933* (2013.01)
  (Continued)

(52) U.S. Cl.
  CPC .............. *H04L 49/10* (2013.01); *H04L 45/02* (2013.01); *H04L 49/30* (2013.01);
  (Continued)

(58) Field of Classification Search
  CPC ............ H04Q 11/0005; H04Q 11/0001; H04L 49/101; H04L 49/15
  (Continued)

(56) References Cited

U.S. PATENT DOCUMENTS 4,013,000 A    3/1977    Kogelnik
5,179,552 A    1/1993    Chao
(Continued)

OTHER PUBLICATIONS

Chen et al; Compact, low-loss and low-power 8x8 broadband silicon optical switch; Aug. 2012; optical society of America.*
(Continued)

*Primary Examiner* — Ken N Vanderpuye
*Assistant Examiner* — Amritbir Sandhu
(74) *Attorney, Agent, or Firm* — Jennifer R. Davis; Ryan, Mason & Lewis, LLP

(57) ABSTRACT

A method for generating a switch fabric topology, comprising constructing a first switch fabric topology, modifying the first switch fabric topology to generate a second switch fabric topology, wherein modifying the first switch fabric topology comprises isolating center stage sets of the first switch fabric topology, and replacing each of the isolated center stage sets with a single $\mathcal{R} \times \mathcal{R}$ switching element to generate the second switch fabric topology, wherein $\mathcal{R}$ is an integer representing a radix of the switching element determined in connection with the constructing of the first switch fabric topology.

8 Claims, 13 Drawing Sheets

(51) Int. Cl.
*H04L 12/935* (2013.01)
*H04L 12/751* (2013.01)
*H04Q 11/00* (2006.01)

(52) U.S. Cl.
CPC ..... *H04Q 11/0005* (2013.01); *H04Q 11/0062* (2013.01); *H04Q 2011/009* (2013.01); *H04Q 2011/0052* (2013.01)

(58) Field of Classification Search
USPC .......................................................... 398/45
See application file for complete search history.

(56) References Cited

U.S. PATENT DOCUMENTS

| | | | |
|---|---|---|---|
| 5,255,332 A | 10/1993 | Welch et al. | |
| 5,884,090 A | 3/1999 | Ramanan et al. | |
| 6,366,713 B1* | 4/2002 | Lin | H04Q 11/00 385/16 |
| 6,665,495 B1 | 12/2003 | Miles et al. | |
| 6,721,313 B1 | 4/2004 | Van Duyne | |
| 6,771,905 B1 | 8/2004 | Bortz | |
| 6,785,438 B2 | 8/2004 | Lin et al. | |
| 6,867,721 B1 | 3/2005 | Lin | |
| 6,882,766 B1 | 4/2005 | Corbalis et al. | |
| 7,133,399 B1 | 11/2006 | Brewer et al. | |
| 7,496,252 B1* | 2/2009 | Corbalis | H04Q 11/0005 385/16 |
| 8,121,478 B2* | 2/2012 | Kash | H04Q 11/0005 398/135 |
| 8,284,771 B1* | 10/2012 | Julien | H04L 49/45 370/386 |
| 8,345,675 B1 | 1/2013 | Raghunath | |
| 8,406,128 B1* | 3/2013 | Brar | H04L 49/15 370/229 |
| 8,687,629 B1 | 4/2014 | Kompella et al. | |
| 9,124,383 B1 | 9/2015 | Frankel et al. | |
| 9,240,905 B2 | 1/2016 | Connolly et al. | |
| 2002/0186434 A1* | 12/2002 | Roorda | H04J 14/0204 398/82 |
| 2003/0063839 A1 | 4/2003 | Kaminski et al. | |
| 2004/0017808 A1* | 1/2004 | Forbes | H04L 49/252 370/390 |
| 2007/0280261 A1 | 12/2007 | Szymanski | |
| 2008/0285449 A1 | 11/2008 | Larsson et al. | |
| 2009/0232492 A1* | 9/2009 | Blair | H04J 14/0206 398/5 |
| 2009/0238565 A1* | 9/2009 | Graves | H04Q 11/0005 398/48 |
| 2010/0278532 A1* | 11/2010 | Scandurra | H04B 10/801 398/45 |
| 2011/0176804 A1* | 7/2011 | Blinkert | G02B 6/356 398/45 |
| 2013/0216225 A1* | 8/2013 | Patel | H04Q 11/0005 398/49 |
| 2014/0328154 A1* | 11/2014 | Mehrvar | H04L 49/25 370/201 |
| 2015/0055952 A1* | 2/2015 | Younce | H04J 14/0212 398/48 |
| 2015/0098700 A1* | 4/2015 | Zhu | H04Q 11/0005 398/48 |
| 2015/0116603 A1* | 4/2015 | Guthrie | G03B 21/206 348/758 |
| 2015/0244647 A1* | 8/2015 | Gopalan | H04L 49/201 370/386 |
| 2015/0249590 A1* | 9/2015 | Gusat | H04L 45/122 370/392 |
| 2016/0277817 A1* | 9/2016 | Lee | H04L 49/10 |

OTHER PUBLICATIONS

L. Chen et al., "Compact, Low-Loss and Low-Power 8 x 8 Broadband Silicon Optical Switch," Optics Express, Aug. 2012, pp. 18977-18985, vol. 20, No. 17.

K. Suzuki et al., "Ultra-Compact 8 x 8 Strictly-Non-Blocking Si-Wire PILOSS Switch," Optics Express, Feb. 2014, pp. 3887-3894, vol. 22, No, 4.

M.C. Wu et al., "Monolithic Large-Scale Optical Switches Using Silicon Photonic MEMS," 19th Optoelectronics and Communications Conference (OECC) and the 39th Australian Conference on Optical Fibre Technology (ACOFT), Jul. 2014, pp. 625-626, Melbourne, Victoria, Australia.

List of IBM Patents or Patent Applications Treated as Related.

* cited by examiner

100

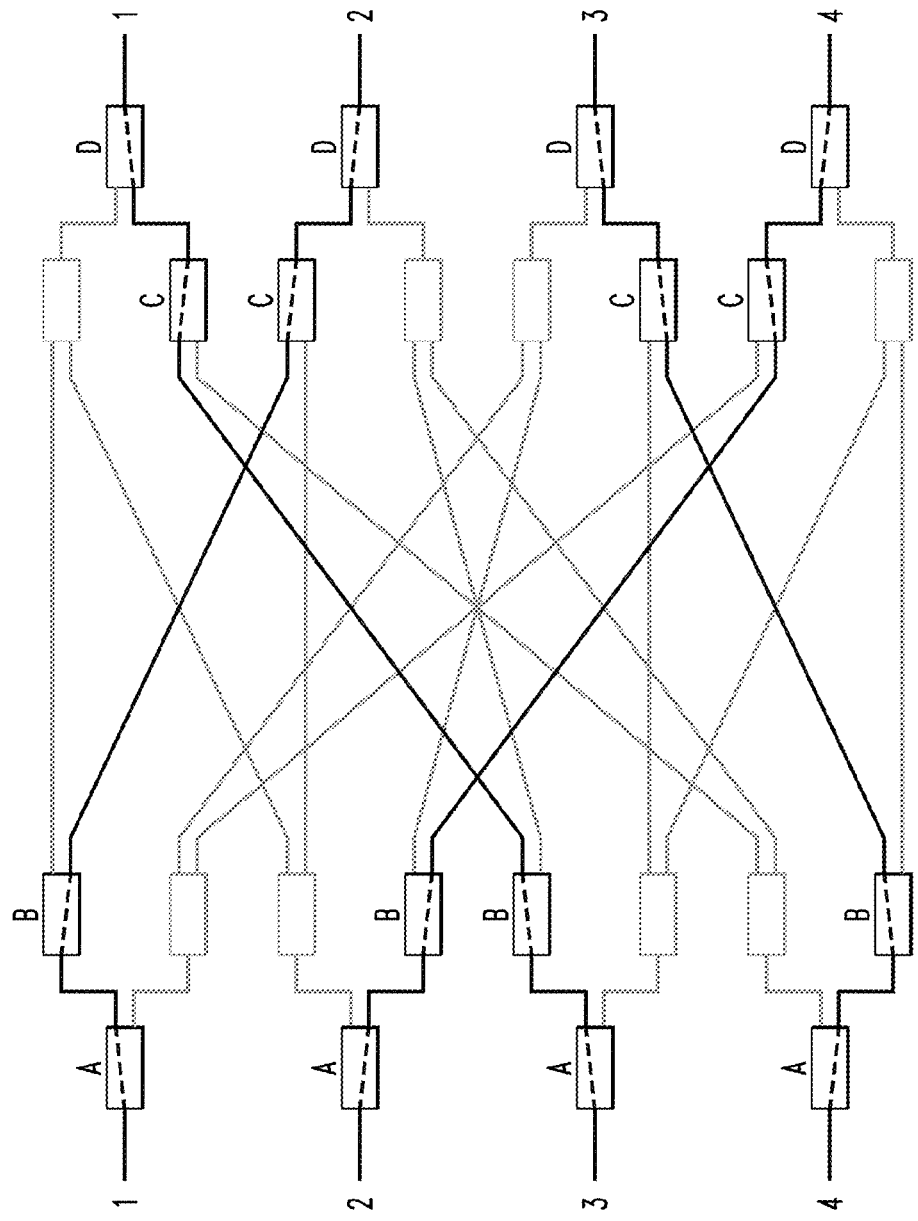

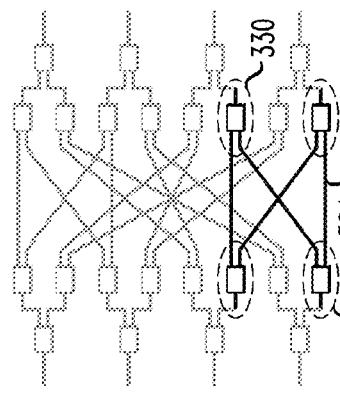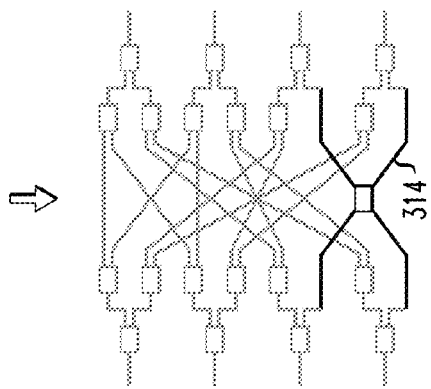
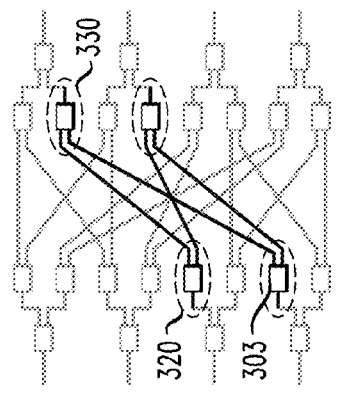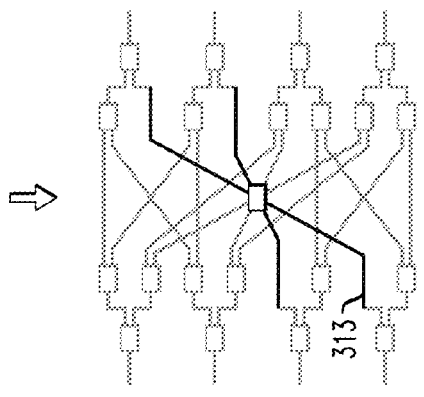
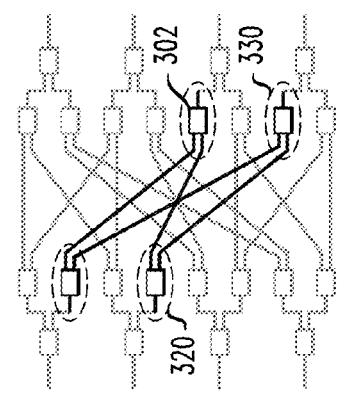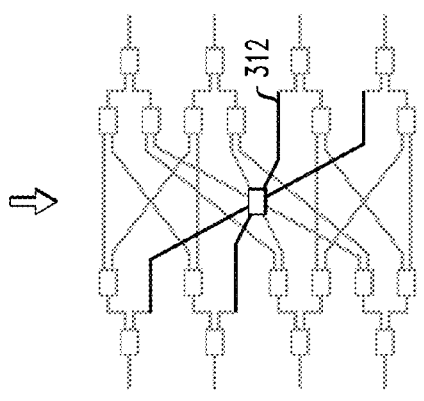
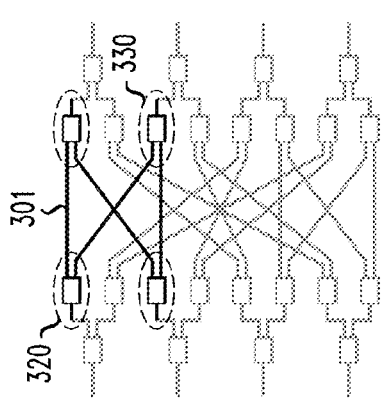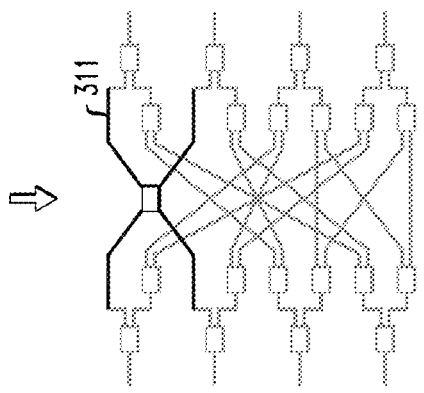
FIG. 3A  FIG. 3B  FIG. 3C  FIG. 3D

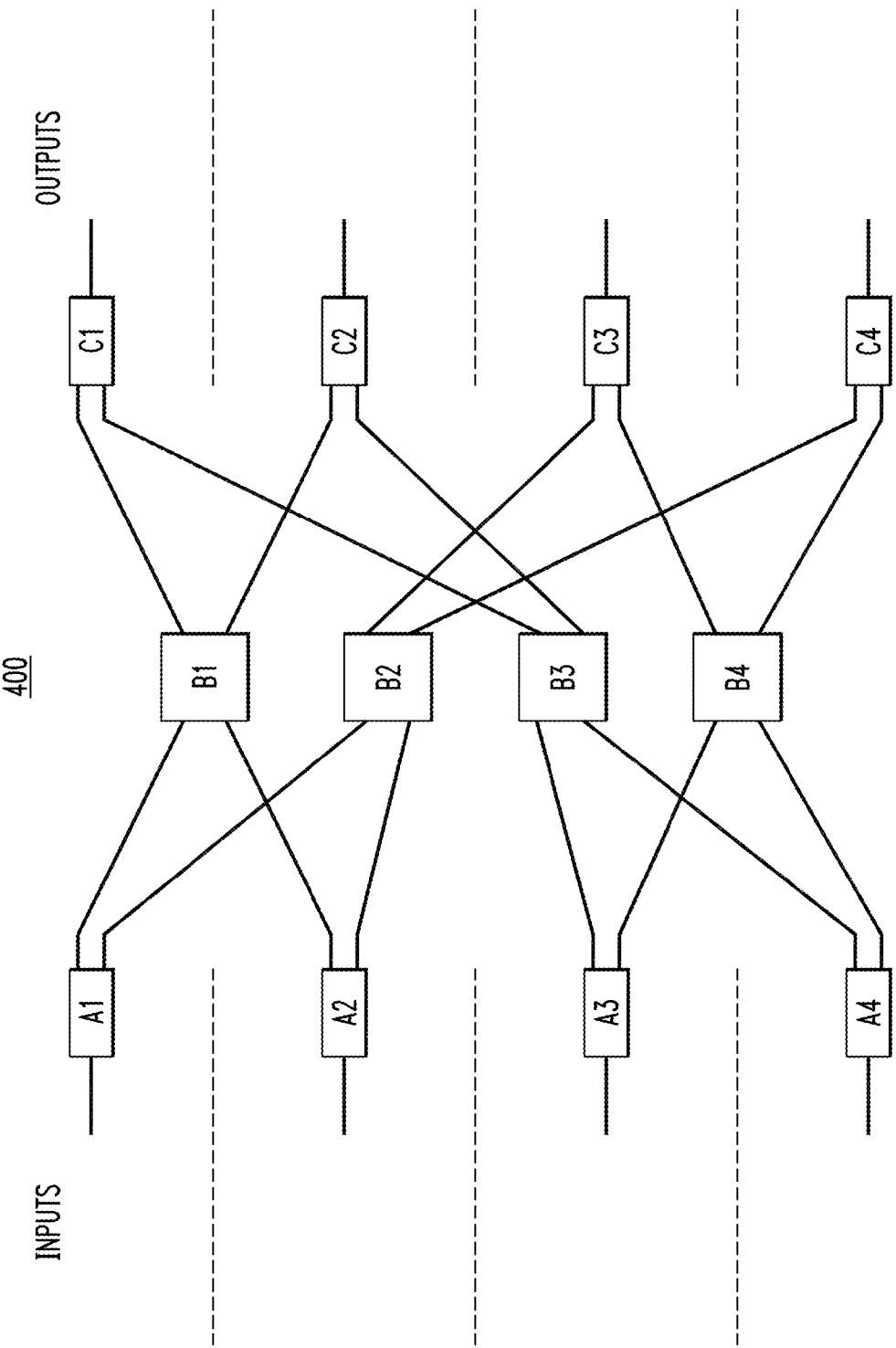

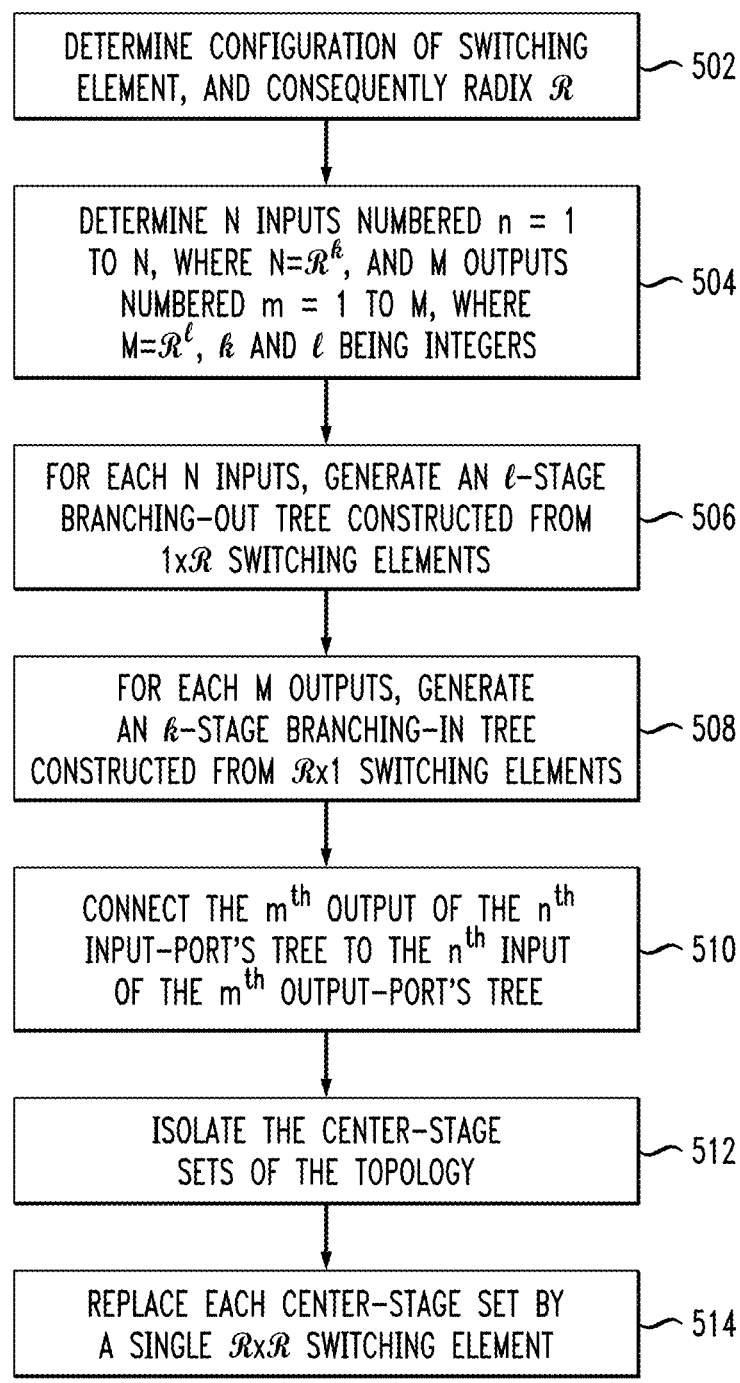

TABLE ASSUMES ℛ = 2

| ROUTER PORTS | BENES | | CROSSBAR | | SWITCH-AND-SELECT | | MODIFIED SWITCH-AND-SELECT | |
|---|---|---|---|---|---|---|---|---|
| | REARRANGEABLY NON-BLOCKING | | STRICTLY NON-BLOCKING | | STRICTLY NON-BLOCKING | | STRICTLY NON-BLOCKING | |
| | SWITCH HOPS | CROSSINGS | SWITCH HOPS | CROSSINGS | SWITCH HOPS | CROSSINGS | SWITCH HOPS | CROSSINGS |
| 4x4 | 3 | 2 | 7 | 0 | 4 | 9 | 3 | 4 |
| 8x8 | 5 | 8 | 15 | 0 | 6 | 49 | 5 | 24 |
| 16x16 | 7 | 22 | 31 | 0 | 8 | 225 | 7 | 112 |
| 32x32 | 9 | 52 | 63 | 0 | 10 | 961 | 9 | 480 |
| 64x64 | 11 | 114 | 127 | 0 | 12 | 3969 | 11 | 1984 |
| NxN | $2\log_2(N)-1$ | $2N-2\log_2(N)-2$ | $2N-1$ | | $2\log_2(N)$ | $(N-1)^2$ | $2\log_2(N)-1$ | $(N-1)^2/2 - 1/2$ |

FIG. 11

TABLE ASSUMES $\mathcal{R} = 2$

| ROUTER PORTS | BENES<br>REARRANGEABLY NON-BLOCKING<br>NO. SWITCHES | CROSSBAR<br>STRICTLY NON-BLOCKING<br>NO. SWITCHES | SWITCH-AND-SELECT<br>STRICTLY NON-BLOCKING<br>NO. SWITCHES | MODIFIED SWITCH-AND-SELECT<br>STRICTLY NON-BLOCKING<br>NO. SWITCHES |
|---|---|---|---|---|
| 4x4 | 6 | 16 | 24 | 12 |
| 8x8 | 20 | 64 | 112 | 64 |
| 16x16 | 56 | 256 | 480 | 288 |
| 32x32 | 144 | 1024 | 1984 | 1216 |
| 64x64 | 352 | 4096 | 8064 | 4992 |
| NxN | $\frac{1}{2} N [2\log_2(N)-1]$ | $N^2$ | $2N^2 - 2N$ | $(5/4) N^2 - 2N$ |

SWITCH AND SELECT TOPOLOGY FOR PHOTONIC SWITCH FABRICS AND A METHOD AND SYSTEM FOR FORMING SAME

CROSS-REFERENCE TO RELATED APPLICATION

This application is a Continuation of U.S. patent application Ser. No. 14/664,108, filed on Mar. 20, 2015, the disclosure of which is incorporated herein by reference in its entirety.

This invention was made with Government support under Contract No. W911NF-12-2-0051 awarded by the Defense Advanced Research Projects Agency (DARPA). The Government has certain rights to this invention.

TECHNICAL FIELD

The field generally relates to a switch and select topology and, in particular, to a switch and select topology for photonic switch fabrics, which reduces the number of switch hops and the number of waveguide crossings, and a method and system for forming same.

BACKGROUND

Traditional electronic switch fabric design is typically driven by power, area, and cost constraints. Consequently, an important metric when choosing a topology for an electronic switch fabric can be the total number of switches in the fabric. Optical or photonic switch fabrics are limited primarily by the number of switches encountered in a signal path (e.g., hops). Where the total number of switching elements may still be an important determiner of cost, power, and area, the primary limiters of photonic switch scale are typically signal integrity constraints determined by the number of switch stages encountered (e.g., hops), and also by the number of other components such as waveguide crossings.

A switch-and-select topology (also known also as a tree-multiplexer switch matrix) provides strictly non-blocking routing functionality. The number of switch hops in an N×N switch-and-select fabric scales according to the order of log(N), similar to a rearrangeably non-blocking Benes topology, wherein N is the number of input ports and output ports. Whereas, a crossbar topology scales in switch hops according to O(N). Switch-and-select topology uses, for example, 1×2 and 2×1 switching elements. In a photonic switch fabric, the switching elements can be realized from a variety of different devices, including, for example, ring resonators or Mach-Zehnder interferometers, which are constructed with 2 inputs and 2 outputs. The switch-and-select disregards one input or one output of these naturally 2×2 switch elements, and this results in favorable crosstalk propagation effects.

SUMMARY

In general, exemplary embodiments of the invention include a switch and select topology and, in particular, a switch and select topology for photonic switch fabrics, which reduces the number of switch hops and the number of waveguide crossings, and a method and system for forming same. In accordance with an embodiment of the present invention, the modified switch-and-select topology reduces the number of switch hops by 1 and reduces the number of waveguide crossings by a factor of 2 with respect to a conventional switch-and-select topology. Application of the embodiments of the present invention can result in a larger scale switch fabric which can be implemented for a given technology platform.

According to an exemplary embodiment of the present invention, a method for generating a switch fabric topology, comprises constructing a first switch fabric topology, modifying the first switch fabric topology to generate a second switch fabric topology, wherein modifying the first switch fabric topology comprises isolating center stage sets of the first switch fabric topology, and replacing each of the isolated center stage sets with a single $\mathcal{R} \times \mathcal{R}$ switching element to generate the second switch fabric topology, wherein $\mathcal{R}$ is an integer representing a radix of the switching element determined in connection with the constructing of the first switch fabric topology.

According to an exemplary embodiment of the present invention, a computer program product for generating a switch fabric topology, comprises a non-transitory computer readable storage medium having program instructions embodied therewith, the program instructions executable by a processor to cause the processor to perform the above method.

According to an exemplary embodiment of the present invention, an apparatus, for generating a switch fabric topology comprises a memory, and a processing device operatively coupled to the memory and configured to construct a first switch fabric topology, and modify the first switch fabric topology to generate a second switch fabric topology, wherein modifying the first switch fabric topology comprises isolating center stage sets of the first switch fabric topology, and replacing each of the isolated center stage sets with a single $\mathcal{R} \times \mathcal{R}$ switching element to generate the second switch fabric topology, wherein $\mathcal{R}$ is an integer representing a radix of the switching element determined in connection with the constructing of the first switch fabric topology.

BRIEF DESCRIPTION OF THE DRAWINGS

Exemplary embodiments of the present invention will be described below in more detail, with reference to the accompanying drawings, of which:

FIGS. 2A and 2B illustrate a 4×4 switch-and-select topology.

FIGS. 3A-3D illustrate isolation and replacement of the 4 center stage sets in a 4×4 switch-and-select topology with 2×2 switches, in accordance with an exemplary embodiment of the present invention.

FIG. 4 shows the resulting 4×4 modified switch-and-select topology based on the combination of replacements from FIGS. 3A-3D.

FIG. 5 is a flow diagram illustrating a method for generating an N×M modified switch-and-select topology using radix $\mathcal{R}$ switching elements, in accordance with an exemplary embodiment of the present invention.

FIGS. 10 and 11 illustrate tables comparing component counts between known topologies and the modified switch-and-select topology in accordance with an exemplary embodiment of the present invention, as a function of port count.

DETAILED DESCRIPTION OF EXEMPLARY EMBODIMENTS

Exemplary embodiments of the invention will now be discussed in further detail with regard to a switch and select topology and, in particular, a switch and select topology for photonic switch fabrics, which reduces the number of switch hops and the number of waveguide crossings, and a method and system for forming same. In connection with optical or photonic switch fabrics, the total number of switch hops or waveguide crossings that must be passed through can limit the scalability of the switch, and embodiments of the present invention aim to keep the total numbers of switch hops and waveguide crossings low. This invention may be embodied in many different forms and should not be construed as limited to the embodiments set forth herein.

As used herein, "hops" or "switch hops" can refer to the total number of switches or switch stages encountered in a signal path of a switch fabric.

As used herein, an "N×M" topology can refer to a topology which has N inputs and M outputs, where N and M are integers.

As used herein, "radix $\mathcal{R}$" can refer to the radix of the switching element that was chosen to be used in the topology, where, for example, a 2×2 switching element (see, e.g., FIGS. 3A-3D) has a radix of 2, a 3×3 switching element has a radix of 3, a 4×4 switching element has a radix of 4, etc. A radix $\mathcal{R}$ switching element may be employed as a 1×$\mathcal{R}$ or as an $\mathcal{R}$×1 switching element by declining to utilize one or more of the inputs or outputs, respectively.

As used herein, "waveguide" can refer to a path between an input tree and an output tree in a switch fabric topology.

As used herein, "waveguide crossing" can refer to when routing an input to an output, one waveguide in a path crossing over another waveguide in a different path.

As used herein, "rearrangeably non-blocking" can refer to a topology which guarantees that there is always a path available from an input to an output in a fabric, but it may require disrupting or shifting another path that is being used in order to provide that path.

As used herein, "strictly non-blocking" can refer to a topology which provides a guaranteed dedicated path for every input and every output in a fabric that can be used at any time.

Figure 1:
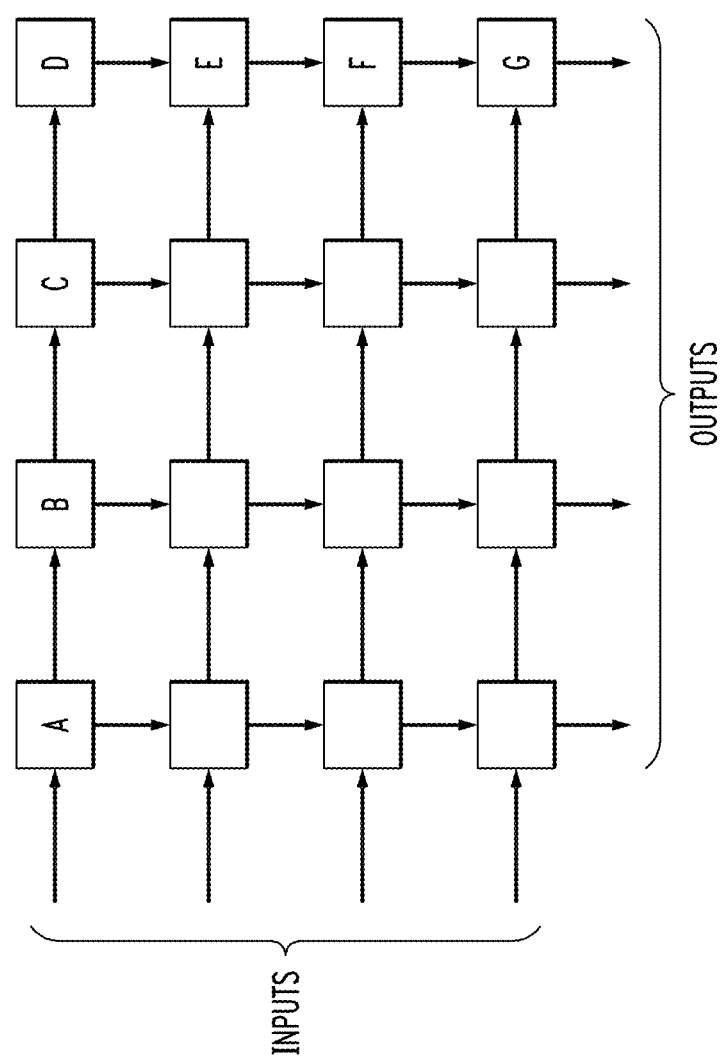
FIG. 1 illustrates a 4×4 crossbar topology, requiring a maximum of 7 switch hops.
Figure 2A:
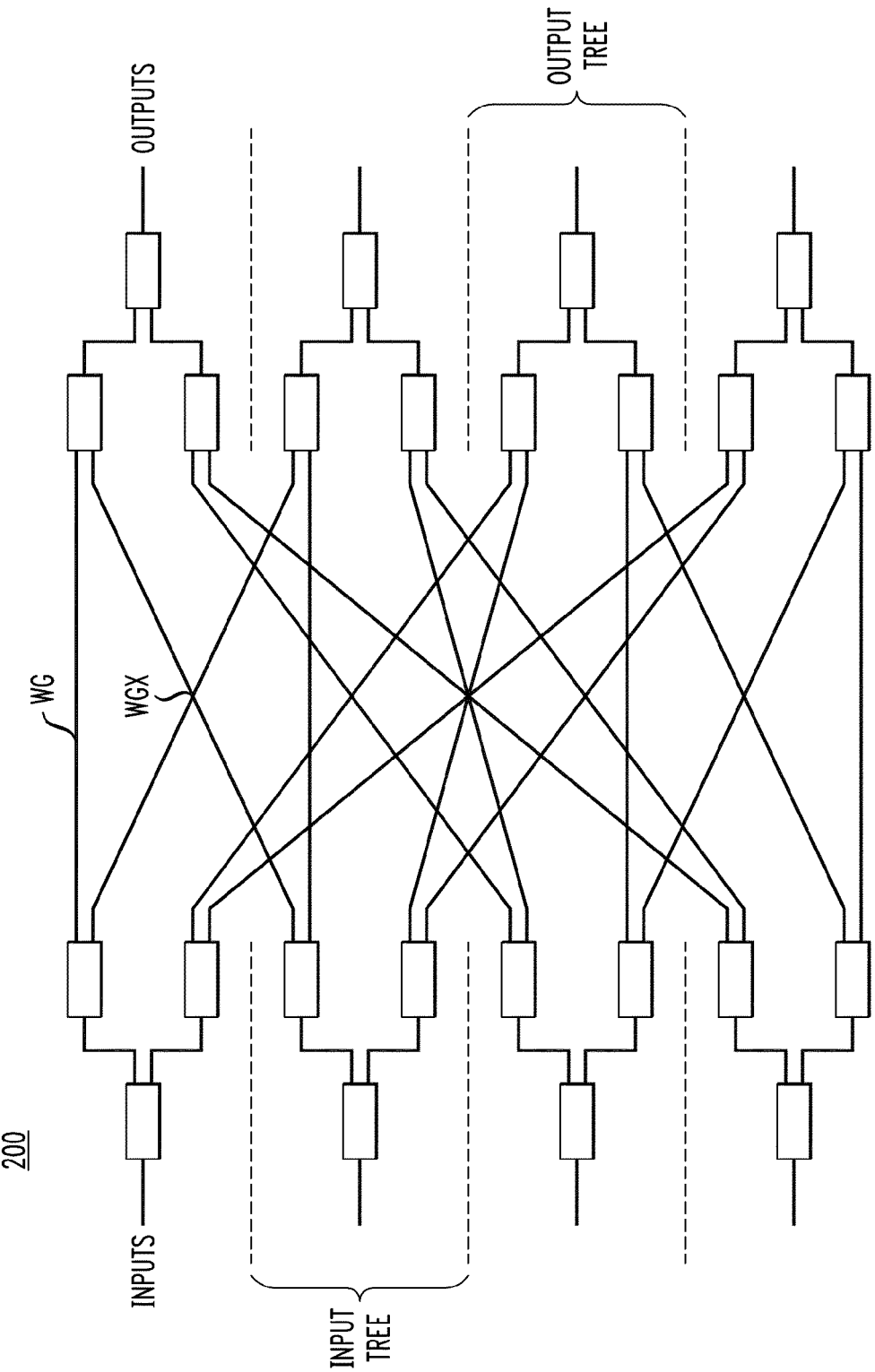

FIG. 1 illustrates a 4×4 crossbar topology 100, requiring a maximum of 7 switch hops from input to output, lettered A to G. FIGS. 2A and 2B illustrate 4×4 switch-and-select topology 200, requiring 4 switch hops from inputs 1, 2, 3, 4 to outputs 1, 2, 3, 4 in any path, lettered A to D in the example paths in FIG. 2B. FIG. 2B shows example configurations from input 1 to output 2, input 2 to output 4, input 3 to output 1 and input 4 to output 3. FIG. 2A illustrates 16 waveguides WG that form paths between input trees and output trees, and an example of a waveguide crossing WGX.

FIGS. 3A-3D illustrate replacement of the 4 center stage sets in a 4×4 switch-and-select topology with 2×2 switches, in accordance with an exemplary embodiment of the present invention, and FIG. 4 shows the resulting 4×4 modified switch-and-select topology 400 based on the combination of replacements from FIGS. 3A-3D. The darker lines in each of FIGS. 3A, 3B, 3C and 3D illustrate the isolation of the respective four center stage sets 301, 302, 303 and 304 that exist in a 4×4 switch-and-select topology constructed from radix 2 switching elements, and their replacement with 2×2 switches 311, 312, 313 and 314. For a 4×4 topology, there are 4 groups of 4 1×2 and 2×1 switches (2 inputs that are 1×2 switches, and 2 outputs that are 2×1 switches) that can each be combined, without loss of functionality, into a single 2×2 switch.

Referring to FIG. 4, the resulting 4×4 modified switch-and-select topology 400 is a strictly non-blocking architecture, which can be implemented in 3 stages rather than 4. As shown in FIG. 4, the respective paths from each of switch stages A1, A2, A3 and A4 to switch stages C1, C2, C3 and C4 are performed in 3 hops as opposed to 4 in the conventional switch-and-select topology. As can be seen when comparing the topologies without replacement in the top row in FIGS. 3A-3D to the topology in FIG. 4, crossings are reduced significantly.

Referring to FIGS. 3A-3D and 4, in accordance with an embodiment of the present invention, sets of 1×2 and 2×1 switch elements in a switch-and-select topology are replaced with a single 2×2 switch element, realizing a new central stage within the fabric. The new fabric is referred to herein as a modified switch-and-select topology.

FIG. 5 is a flow diagram illustrating a method for generating an N×M modified switch-and-select topology using radix $\mathcal{R}$ switching elements, in accordance with an exemplary embodiment of the present invention.

For a fabric with N inputs and M outputs (i.e., N×M), such as, for example, a 4×4 switch-and-select topology as discussed above in connection with FIGS. 3A-3D, a modified switch-and-select topology is constructed in accordance with the method 500. At block 502, a configuration of a switching element (e.g., 2×2) is determined, and consequently radix $\mathcal{R}$ is also determined.

At block 504, N inputs numbered n=1 to N are determined, where N=$\mathcal{R}^k$, and M outputs numbered m=1 to M are determined, where M=$\mathcal{R}^l$, $k$ and $l$ being integers. Assuming a 2×2 switching element is chosen, then the radix $\mathcal{R}$ is 2, and, in this case, N is a power of 2 such that N=$2^k$, and M is a power of 2 such that M=$2^l$. In the case of a 4×4 switch-and-select topology, and a radix of 2, both N and M are 4, and l and $k$, are 2 (4=$2^2$).

Figure 6:
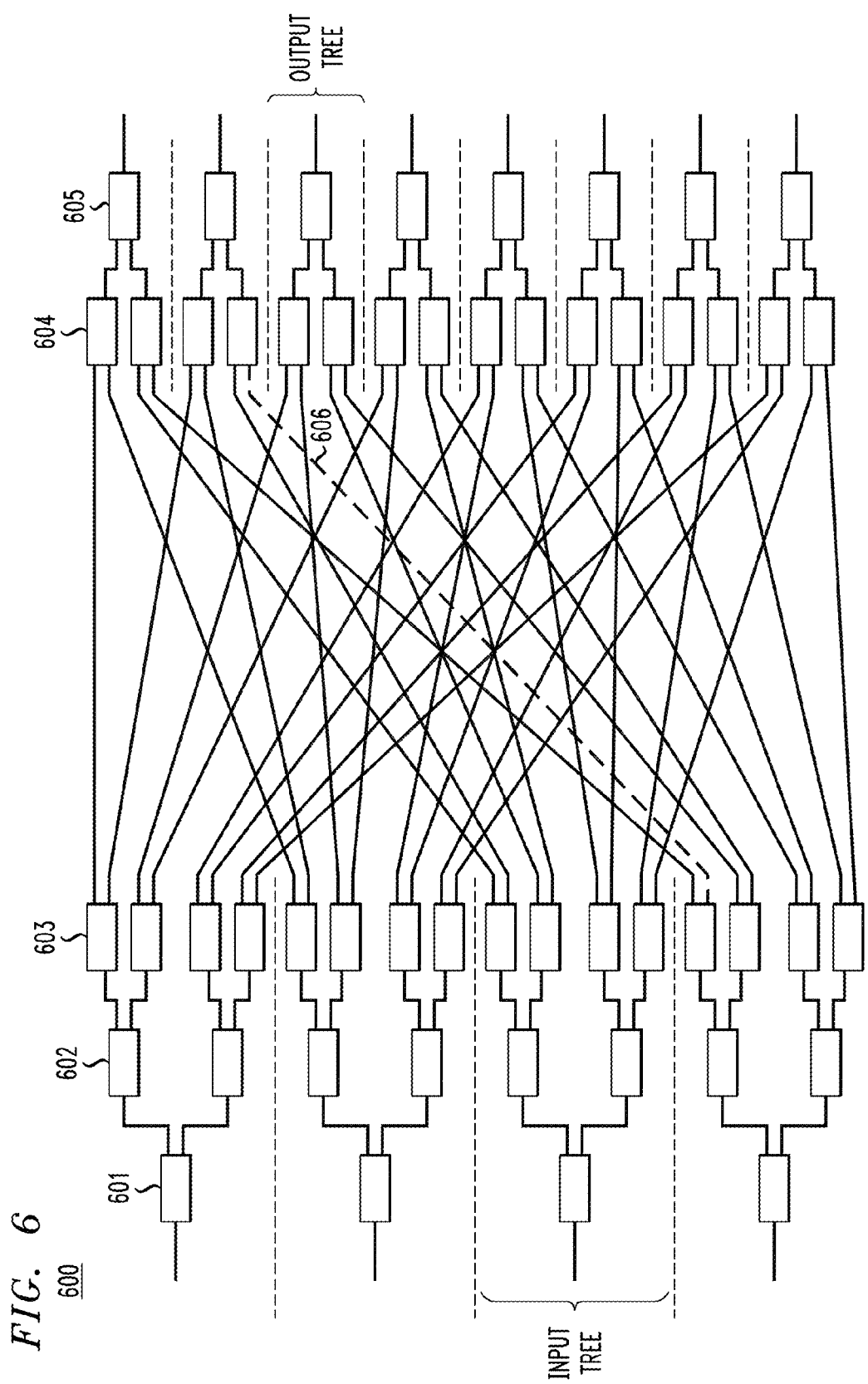
FIG. 6 illustrates a 4×8 switch-and-select topology.
Figure 7B:
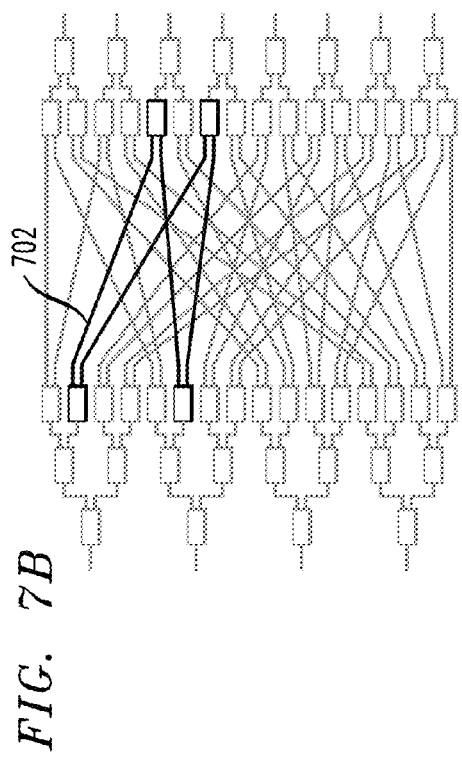
FIGS. 7A-7H illustrate isolation of center-stage sets in a 4×8 switch-and-select topology, in accordance with an exemplary embodiment of the present invention.
Figure 7D:
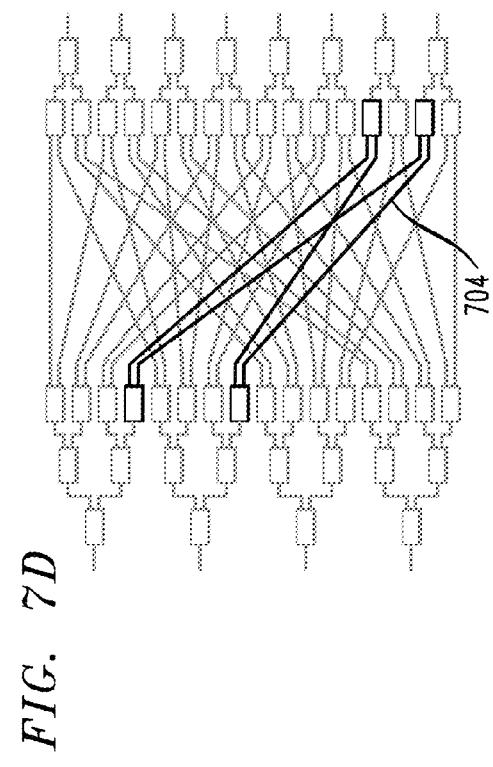
Figure 7A:
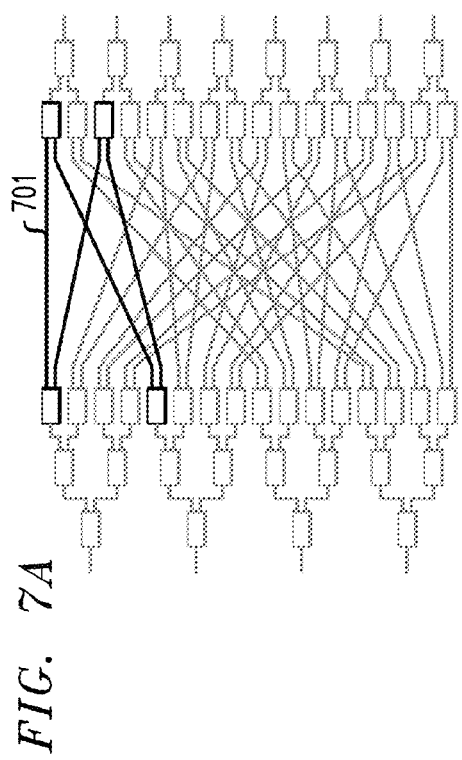
Figure 7C:
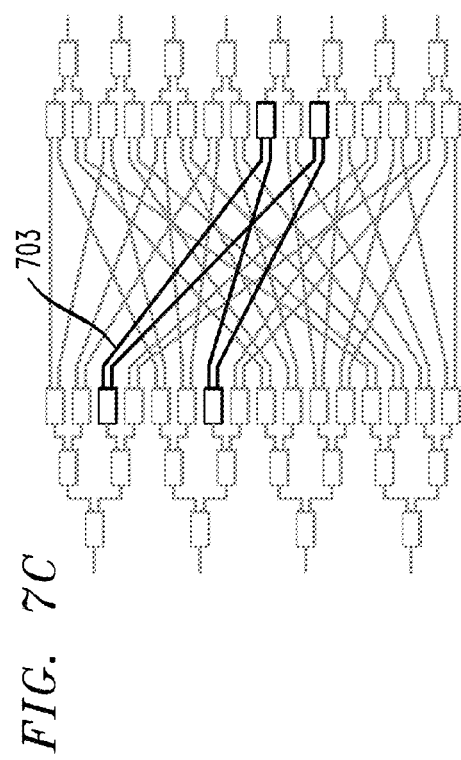
Figure 7F:
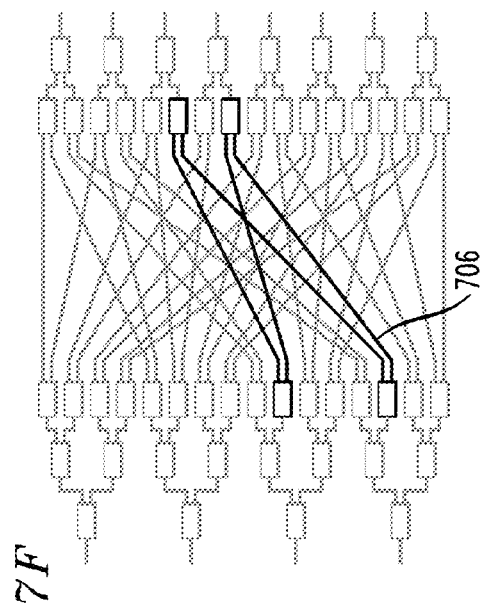
Figure 7H:
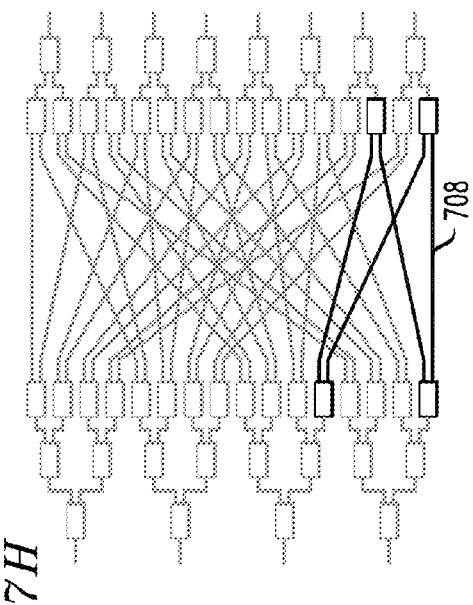
Figure 7E:
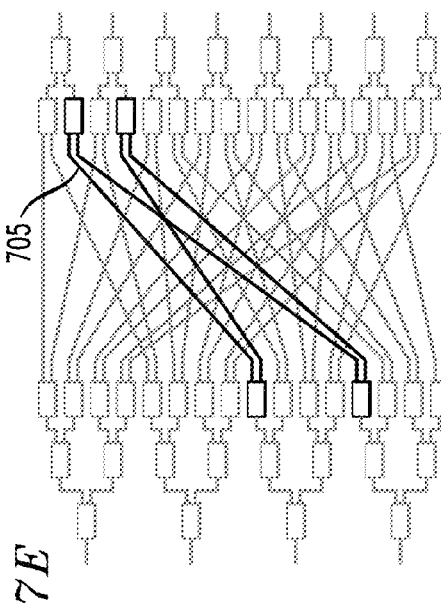
Figure 7G:
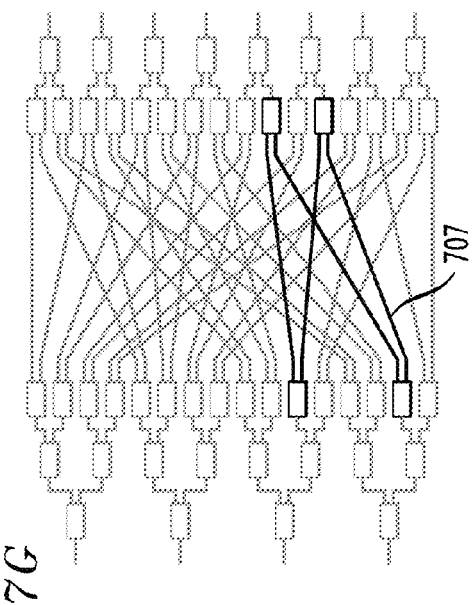

Referring to block 506, the method 500 further comprises, for each of the N inputs, generating an l-stage branching-out tree (e.g., binary tree in the case of the 4×4 topology) constructed from 1×$\mathcal{R}$ (e.g., 1×2) switching elements. Referring to block 508, the method 500 further comprises, for each of the M outputs, generating a $k$-stage branching-in tree (e.g., binary tree in the case of the 4×4 topology) constructed from R×1 (e.g., 2×1) switching elements. Then, at block 510, the method 500 further comprises, connecting the $m^{th}$ output of the $n^{th}$ input tree to the $n^{th}$ input of the $m^{th}$ output tree. In this example, an input tree is an l-stage branching out tree, and an output tree is a $k$-stage branching-in tree. Examples of input and output trees are labeled in FIGS. 2A and 6. Referring to FIG. 6, where N=4, and M=8, a dashed line 606 connects the $2^{nd}$ output of the $4^{th}$ input tree to the $4^{th}$ input of the $2^{nd}$ output tree.

Referring to FIG. 6, in connection with a 4×8 switch-and-select topology 600, and a radix of 2, l is equal to 3 since M= $\mathcal{R}^l$ (8=$2^3$), and on an input side, the number of switch hops required to get from each of the 4 inputs to each respective input tree output (i.e., branch-out to each respective output) is 3 (see, e.g., 601, 602 and 603 in FIG. 6). On the output side, $k$ is equal to 2 since N=$\mathcal{R}^k$ (4=$2^2$), and, on an output side, the number of switch hops required to get from an output tree input to each of the 8 outputs (i.e., branch-in to each respective output) is 2 (see, e.g., 604 and 605 in FIG. 6). Accordingly, in connection with the 4×8 switch-and-select topology 600, a 3-stage branching out tree is constructed from 1×2 switching elements and a 2-stage (binary) branching in tree is constructed from 2×1 switching elements.

Next, with reference to blocks 512 and 514, the switch-and-select topology is altered to achieve the modified switch-and-select topology. This is done by isolating the center stage sets of the topology (see, e.g., center stage sets 301, 302, 303 and 304 of FIGS. 3A-3D, and center stage sets 701, 702, 703, 704, 705, 706, 707 and 708 of FIGS. 7A-7H) and replacing them each with a single $\mathcal{R}\times\mathcal{R}$ switching element (e.g., 2×2 switching element). Each center-stage set consists of the $\mathcal{R}1\times\mathcal{R}$ switching elements in the final stage of the input-port trees and the $\mathcal{R}$ $\mathcal{R}\times1$ switching elements in the first stage of the output-port trees which are all connected by $\mathcal{R}^2$ waveguides. Referring to FIGS. 3A-3D, in each center stage set 301-304, two 1×2 switching elements are circled using dotted lines (labeled 320), and two 2×1 switching elements are circled using dashed lines (labeled 330). There are N×M/($\mathcal{R}^2$) center-stage sets to replace.

In the case of if $\mathcal{R}$=2, each center-stage set consists of the two 1×2 switching elements respectively in the final stage of two input binary trees and the two 2×1 switching elements respectively in the first stage of two output binary trees, wherein the switching elements are connected. Each of the two 1×2 switching elements and the two 2×1 switching elements are connected to each other by $\mathcal{R}^2$ (in this case, 4) waveguides. There are N×M/(4) center-stage sets to replace. Accordingly, in the illustrated examples, by replacing each center stage set 301-304 and 701-708 having a waveguide crossing at its center with a single 2×2 switch, a signal propagated through two switches and possibly a waveguide crossing is being replaced by a signal that would propagate through one switch and no waveguide crossing.

Figure 8:
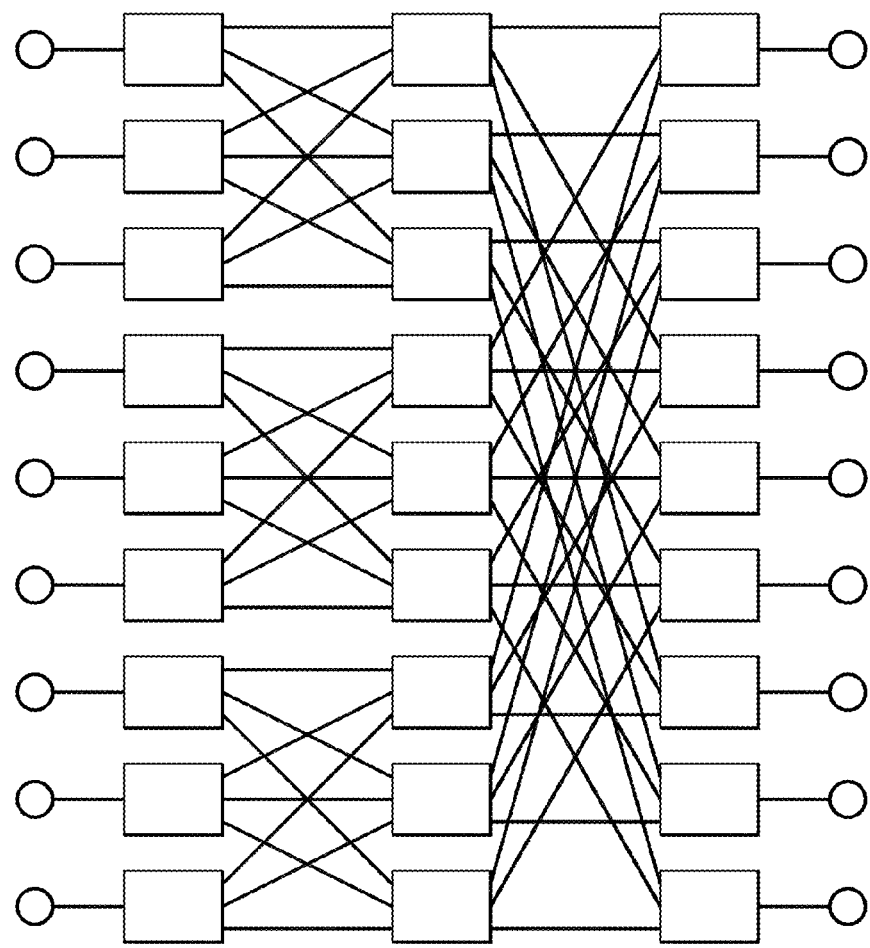
FIG. 8 illustrates a 9×9 modified switch-and-select topology, in accordance with an exemplary embodiment of the present invention.

The embodiments of the present invention can be scaled to fabrics employing higher radix switch elements by employing the same approach as outlined above in connection with FIG. 5. For purposes of explanation, the embodiments of the present invention are described herein using switch elements of radix $\mathcal{R}$, where $\mathcal{R}$=2 is the assumed radix of the switching elements. However, it is to be understood that the embodiments of the present invention are not limited to situations where $\mathcal{R}$=2, and may be applied to alternative radices. For example, FIG. 8 illustrates a 9×9 modified switch-and-select topology 800, in accordance with an exemplary embodiment of the present invention, where the radix $\mathcal{R}$ is 3. FIG. 8 illustrates that the embodiments of the present invention can be applied to a topology with arbitrary radices, $\mathcal{R}$, of the switching elements other than those described above. For example, the 9×9 modified switch-and-select topology is shown in FIG. 8 using 1×3 switching elements in the input tree, 3×3 switching elements in the center stage, and 3×1 switching elements in the output tree. FIG. 8 shows the resulting topology after center-stage set isolation and replacement in accordance with the embodiments of the present invention.

The embodiments of the present invention have been described herein in connection with modifying a switch-and-select topology. However, the embodiments of the present invention are not limited thereto, and can be applied to modify other topologies, including, but not limited to, a dilated Banyan topology, and other topologies in the photonics, optical or electrical fields.

Figure 9:
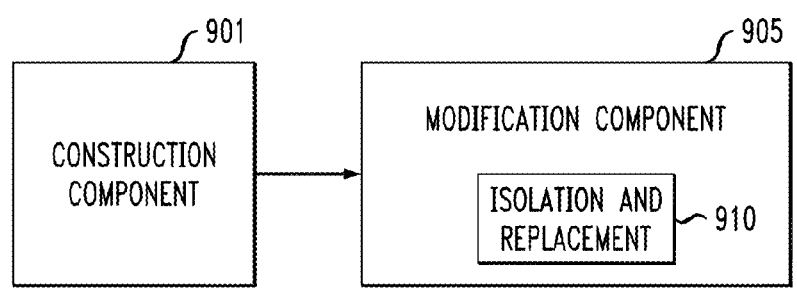
FIG. 9 is high-level diagram showing detail of a system for generating a modified switch-and-select topology, according to an exemplary embodiment of the invention.

FIG. 9 shows a proposed system architecture showing detail of a system for generating a modified switch-and-select topology, according to an exemplary embodiment of the invention. As shown in FIG. 9 by lines and/or arrows, the components of the system 900 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

The system 900 for generating a switch fabric topology, comprises a construction component 901 configured to construct a first switch fabric topology, such as, for example, a switch-and-select topology. A modification component 905 operatively coupled to the construction component 901 is configured to modify the first switch fabric topology to generate a second switch fabric topology, such as, for example, a modified switch-and-select topology, which comprises less switches, less switch hops and less waveguide crossings than the first switch fabric topology.

According to an embodiment of the present invention, the modification component 905 includes an isolation and replacement component 910 configured to isolate center stage sets of the first switch fabric topology, and replace each of the isolated center stage sets with a single $\mathcal{R}\times\mathcal{R}$ switching element to generate the second switch fabric topology. $\mathcal{R}$ is an integer representing a radix of the switching element determined by the construction component 901 in connection with the constructing of the first switch fabric topology.

According to an embodiment of the present invention, each isolated center-stage set comprises $\mathcal{R}1\times\mathcal{R}$ switching elements in a final stage of a plurality of input-port trees and $\mathcal{R}$ $\mathcal{R}\times1$ switching elements in a first stage of a plurality of output-port trees, wherein the $\mathcal{R}1\times\mathcal{R}$ switching elements are connected with the $\mathcal{R}$ $\mathcal{R}\times1$ switching elements by $\mathcal{R}^2$ waveguides. The first and second switch fabric topologies each comprise N input ports and M output ports, where N and M are integers, and a number of the center stage sets replaced is given by N×M/($\mathcal{R}^2$).

According to an embodiment of the present invention, the construction component 901 is configured to construct the first switch fabric topology by determining a number of input ports N and a number of output ports M for the first switch fabric topology, wherein N=$\mathcal{R}$ $k$ and M=$\mathcal{R}^l$, and N, M, $k$ and l are integers. The construction component 901 is also configured to generate an l-stage branching-out tree constructed from 1×$\mathcal{R}$ switching elements for each of the N input ports, and generate a $k$-stage branching-in tree constructed from $\mathcal{R}\times1$ switching elements for each of the M output ports. The construction component 901 can also be configured to connect an $m^{th}$ output of an $n^{th}$ branching-out tree to an $n^{th}$ input of an $m^{th}$ branching-in tree, wherein m=integers from 1 to M, and n=integers from 1 to N.

In accordance with an embodiment, a switch fabric can be formed which has a modified topology, for example, the modified switch-and-select topology generated by the isolation and replacement of the center stage sets as discussed herein. A switch fabric having a topology modified in accordance with the embodiments of the present invention can be present in any number of devices or network configurations, which use switch fabrics, including, but not limited to, network devices, controllers, optical and fiber devices, switchers, routers, multiplexers, input/output devices, transmitters, receivers, and the like. The embodiments of the present invention may be applied to modify and replace a topology which exists in a device or network configuration, and/or to newly construct a topology to be installed in connection with a device or network configuration.

FIGS. 10 and 11 illustrate tables comparing component counts (e.g., switch hops, waveguide crossings and switches) between known topologies and the modified switch-and-select topology in accordance with an embodiment of the present invention, as a function of port count. FIGS. 10 and 11 tabulate results that highlight the improved performance offered by the embodiments of the present invention for photonic switch fabrics. Referring to FIG. 10, the modified switch-and-select topology provides strictly non-blocking functionality, and requires the same number of switch hops as a Benes network, which provides only rearrangeably non-blocking functionality. The modified switch-and-select topology provides one fewer hop and approximately half the number of waveguide crossings when compared with the conventional switch-and-select version for each port configuration. Referring to FIG. 11, the modified switch-and-select topology scales more similarly than the conventional switch-and-select topology to the crossbar topology in terms of total number of switches in the fabric.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
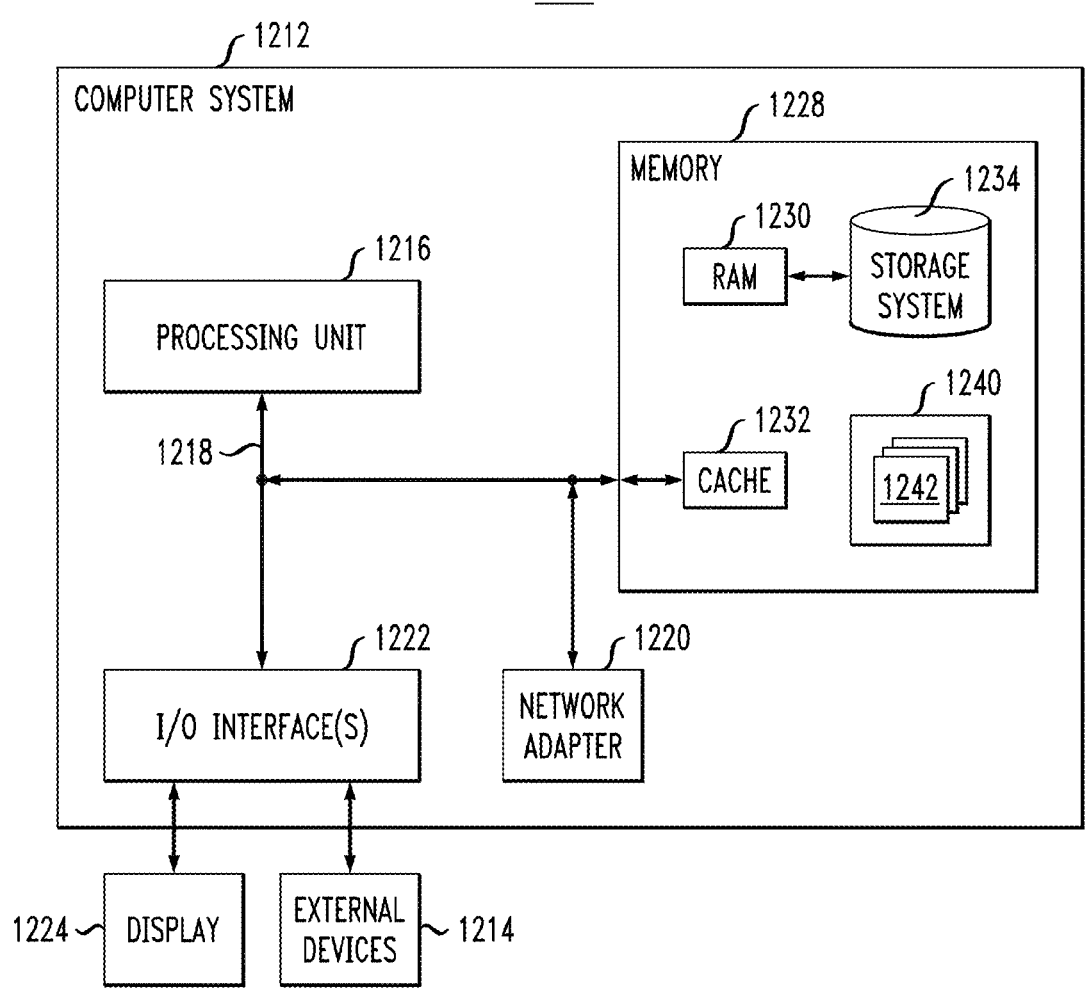
FIG. 12 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as random access memory (RAM) 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a non-transitory computer readable storage medium having program instructions embodied therewith, the program instructions executable by a processor to cause the processor to perform a method comprising:
   constructing a first switch fabric topology; and
   modifying the first switch fabric topology to generate a second switch fabric topology, wherein modifying the first switch fabric topology comprises:
      isolating center stage sets of the first switch fabric topology; and
      replacing each of the isolated center stage sets with a single $\mathcal{R} \times \mathcal{R}$ switching element to generate the second switch fabric topology;
   wherein $\mathcal{R}$ is an integer representing a radix of the switching element determined in connection with the constructing of the first switch fabric topology;
   wherein each isolated center-stage set comprises $\mathcal{R}$ $1 \times \mathcal{R}$ switching elements in a final stage of a plurality of input-port trees and $\mathcal{R}$ $\mathcal{R} \times 1$ switching elements in a first stage of a plurality of output-port trees; and
   wherein the $\mathcal{R} 1 \times \mathcal{R}$ switching elements are connected with the $\mathcal{R}$ $\mathcal{R} \times 1$ switching elements by $\mathcal{R}^2$ waveguides.

2. The computer program product according to claim 1, wherein:
   the first and second switch fabric topologies each comprise N input ports and M output ports, where N and M are integers; and
   a number of the center stage sets replaced is given by N×M/($\mathcal{R}^2$).

3. The computer program product according to claim 1, wherein the first switch fabric topology comprises a switch-and-select topology.

4. The computer program product according to claim 1, wherein the second switch fabric topology comprises less switches, less switch hops and less waveguide crossings than the first switch fabric topology.

5. A computer program product comprising a non-transitory computer readable storage medium having program instructions embodied therewith, the program instructions executable by a processor to cause the processor to perform a method comprising:
   constructing a first switch fabric topology; and
   modifying the first switch fabric topology to generate a second switch fabric topology, wherein modifying the first switch fabric topology comprises:
      isolating center stage sets of the first switch fabric topology; and
      replacing each of the isolated center stage sets with a single $\mathcal{R} \times \mathcal{R}$ switching element to generate the second switch fabric topology;
   wherein $\mathcal{R}$ is an integer representing a radix of the switching element determined in connection with the constructing of the first switch fabric topology; and
   wherein constructing the first switch fabric topology comprises:
      determining a number of input ports N and a number of output ports M for the first switch fabric topology, wherein N=$\mathcal{R}^k$ and M=$\mathcal{R}^l$, and N, M, $k$ and l are integers;
      for each of the N input ports, generating an C-stage branching-out tree constructed from $1 \times \mathcal{R}$ switching elements;
      for each of the M output ports, generating a $k$-stage branching-in tree constructed from $\mathcal{R} \times 1$ switching elements; and
   connecting an $m^{th}$ output of an $n^{th}$ branching-out tree to an $n^{th}$ input of an $m^{th}$ branching-in tree, wherein m=integers from 1 to M, and n=integers from 1 to N.

6. An apparatus, comprising:
   a memory; and
   a processing device operatively coupled to the memory and configured to:
      construct a first switch fabric topology; and
      modify the first switch fabric topology to generate a second switch fabric topology, wherein modifying the first switch fabric topology comprises:
         isolating center stage sets of the first switch fabric topology; and
         replacing each of the isolated center stage sets with a single $\mathcal{R} \times \mathcal{R}$ switching element to generate the second switch fabric topology;
      wherein $\mathcal{R}$ is an integer representing a radix of the switching element determined in connection with constructing the first switch fabric topology;
      wherein each isolated center-stage set comprises $\mathcal{R}$ $1 \times \mathcal{R}$ switching elements in a final stage of a plurality of input-port trees and $\mathcal{R}$ $\mathcal{R} \times 1$ switching elements in a first stage of a plurality of output-port trees; and
      wherein the $\mathcal{R} 1 \times \mathcal{R}$ switching elements are connected with the $\mathcal{R}$ $\mathcal{R} \times 1$ switching elements by $\mathcal{R}^2$ waveguides.

7. The apparatus according to claim 6, wherein:
   the first and second switch fabric topologies each comprise N input ports and M output ports, where N and M are integers; and
   a number of the center stage sets replaced is given by N×M/($\mathcal{R}^2$).

8. An apparatus comprising:
   a memory; and
   a processing device operatively coupled to the memory and configured to:
      construct a first switch fabric topology; and
      modify the first switch fabric topology to generate a second switch fabric topology, wherein modifying the first switch fabric topology comprises:
         isolating center stage sets of the first switch fabric topology; and
         replacing each of the isolated center stage sets with a single $\mathcal{R} \times \mathcal{R}$ switching element to generate the second switch fabric topology;
      wherein $\mathcal{R}$ is an integer representing a radix of the switching element determined in connection with constructing the first switch fabric topology; and
      wherein constructing the first switch fabric topology comprises:
         determining a number of input ports N and a number of output ports M for the first switch fabric topology, wherein N=$\mathcal{R}^k$ and M=$\mathcal{R}^l$, and N, M, $k$ and l are integers;
         for each of the N input ports, generating an l-stage branching-out tree constructed from $1 \times \mathcal{R}$ switching elements;
         for each of the M output ports, generating a $k$-stage branching-in tree constructed from $\mathcal{R} \times 1$ switching elements; and connecting an m$^{th}$ output of an n$^{th}$ branching-out tree to an n$^{th}$ input of an m$^{th}$ branching-in tree, wherein m=integers from 1 to M, and n=integers from 1 to N.

\* \* \* \* \*